US009213961B2

(12) United States Patent
Strutton et al.

(10) Patent No.: US 9,213,961 B2
(45) Date of Patent: Dec. 15, 2015

(54) SYSTEMS AND METHODS FOR GENERATING SOCIAL INDEX SCORES FOR KEY TERM ANALYSIS AND COMPARISONS

(75) Inventors: Michael J. Strutton, Villa Rica, GA (US); James V. Anderson, Atlanta, GA (US); Jon M. Lee, Atlanta, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 361 days.

(21) Appl. No.: 12/563,529

(22) Filed: Sep. 21, 2009

(65) Prior Publication Data

US 2010/0076966 A1  Mar. 25, 2010

Related U.S. Application Data

(60) Provisional application No. 61/098,792, filed on Sep. 21, 2008.

(51) Int. Cl.
*G06Q 10/10* (2012.01)
*G06F 17/30* (2006.01)
*G06Q 50/00* (2012.01)

(52) U.S. Cl.
CPC ............ *G06Q 10/10* (2013.01); *G06F 17/3005* (2013.01); *G06F 17/30038* (2013.01);
(Continued)

(58) Field of Classification Search
CPC .............. G06F 17/30; G06F 17/30867; G06F 17/30997; G06F 17/30979; G06F 17/30864; G06F 17/30106; G06F 17/30973; G06F 17/3005; G06F 17/30097; G06F 17/30312; G06F 17/30321; Y10S 707/99932; Y10S 707/99933; Y10S 707/99931; Y10S 707/99934; Y10S 707/99943; H04L 67/22; H04L 67/306; H04L 67/26; H04L 67/02; H04L 12/588; H04L 12/5855; H04L 51/14; H04L 51/32; G06Q 10/10; G06Q 50/01; G06Q 30/02; G06Q 50/00
USPC .......... 707/706, 722, 728, 730, 772, E17.032, 707/E17.108, 999.003; 705/7.29, 7.32, 705/14.44, 14.6
See application file for complete search history.

(56) References Cited

U.S. PATENT DOCUMENTS 5,749,081 A * 5/1998 Whiteis .................................. 1/1
2004/0083133 A1 4/2004 Nicholas et al.
(Continued)

FOREIGN PATENT DOCUMENTS

WO WO 2012/058408 * 5/2012

OTHER PUBLICATIONS

Towards a New Multimedia Paradigm, Hoogeveen, ED-Media 95 Proceedings. 2005.*
(Continued)

*Primary Examiner* — Srirama Channavajjala
(74) *Attorney, Agent, or Firm* — Vista IP Law Group, LLP (57) ABSTRACT

In one aspect, the present disclosure relates to a method, in a computer network, for generating social index scores associated with key terms within web-based social network sites. Generally, the method comprises the steps of receiving an input of the key terms from a user, generating search queries from the key terms, providing the generated search queries to the web-based social network sites, capturing search results received from the web-based social network sites in response to the provided search queries, generating, from the captured search results, the social index scores using a processing algorithm, storing the generated social index scores in at least one database, and, providing at least one representation of the generated social index scores to the user in one or more of numerical, visual, and printed form.

27 Claims, 6 Drawing Sheets

(52) U.S. Cl.
CPC .... *G06F17/30097* (2013.01); *G06F 17/30106* (2013.01); *G06F 17/30312* (2013.01); *G06F 17/30321* (2013.01); *G06F 17/30846* (2013.01); *G06F 17/30864* (2013.01); *G06F 17/30973* (2013.01); *G06Q 50/01* (2013.01)

(56) References Cited

U.S. PATENT DOCUMENTS

| | | | |
|---|---|---|---|
| 2005/0018611 A1 | 1/2005 | Chan et al. | |
| 2005/0055341 A1* | 3/2005 | Haahr et al. | 707/3 |
| 2005/0091202 A1* | 4/2005 | Thomas | 707/3 |
| 2006/0026655 A1 | 2/2006 | Perez | |
| 2006/0143081 A1* | 6/2006 | Argaiz | 705/14 |
| 2006/0294134 A1* | 12/2006 | Berkhim et al. | 707/102 |
| 2007/0124432 A1* | 5/2007 | Holtzman et al. | 709/219 |
| 2007/0150335 A1 | 6/2007 | Arnett et al. | |
| 2007/0214097 A1* | 9/2007 | Parsons et al. | 706/12 |
| 2007/0250468 A1* | 10/2007 | Pieper | 707/1 |
| 2007/0297641 A1 | 12/2007 | Criddle et al. | |
| 2008/0104679 A1 | 5/2008 | Craig | |
| 2008/0109245 A1* | 5/2008 | Gupta | 705/1 |
| 2008/0109306 A1 | 5/2008 | Maigret et al. | |
| 2008/0114755 A1* | 5/2008 | Wolters et al. | 707/5 |
| 2008/0168079 A1 | 7/2008 | Smith et al. | |
| 2008/0184135 A1 | 7/2008 | Washburn et al. | |
| 2008/0189254 A1* | 8/2008 | Cancel et al. | 707/3 |
| 2008/0222295 A1 | 9/2008 | Robinson et al. | |
| 2008/0248815 A1 | 10/2008 | Busch | |
| 2008/0294624 A1* | 11/2008 | Kanigsberg et al. | 707/5 |
| 2009/0006371 A1* | 1/2009 | Denoue et al. | 707/5 |
| 2009/0006388 A1* | 1/2009 | Ives et al. | 707/5 |
| 2009/0037412 A1* | 2/2009 | Bard et al. | 707/5 |
| 2009/0048904 A1* | 2/2009 | Newton et al. | 705/10 |
| 2009/0049070 A1 | 2/2009 | Steinberg | |
| 2009/0063284 A1 | 3/2009 | Turpin et al. | |
| 2009/0070412 A1 | 3/2009 | D'Angelo et al. | |
| 2009/0119173 A1 | 5/2009 | Parsons et al. | |
| 2009/0144392 A1 | 6/2009 | Wang et al. | |
| 2009/0198487 A1 | 8/2009 | Wong et al. | |
| 2009/0216741 A1* | 8/2009 | Thrall et al. | 707/5 |
| 2009/0222348 A1 | 9/2009 | Ransom et al. | |
| 2009/0319518 A1* | 12/2009 | Koudas et al. | 707/5 |
| 2010/0063961 A1* | 3/2010 | Guiheneuf et al. | 707/622 |
| 2010/0121857 A1* | 5/2010 | Elmore et al. | 707/748 |
| 2010/0125563 A1 | 5/2010 | Nair et al. | |
| 2010/0146144 A1 | 6/2010 | Audenaert et al. | |
| 2010/0218128 A1 | 8/2010 | Bonat et al. | |
| 2010/0228617 A1 | 9/2010 | Ransom et al. | |
| 2010/0250330 A1 | 9/2010 | Lam et al. | |
| 2010/0280860 A1 | 11/2010 | Iskold | |
| 2010/0318613 A1 | 12/2010 | Souza et al. | |
| 2010/0332330 A1 | 12/2010 | Goel et al. | |
| 2010/0332962 A1 | 12/2010 | Hammer et al. | |
| 2011/0004692 A1 | 1/2011 | Occhino et al. | |
| 2011/0078188 A1 | 3/2011 | Li et al. | |
| 2011/0082858 A1 | 4/2011 | Yu et al. | |
| 2011/0099070 A1 | 4/2011 | Eliason | |
| 2011/0112899 A1 | 5/2011 | Strutton et al. | |
| 2011/0125550 A1 | 5/2011 | Erhart et al. | |
| 2011/0131504 A1 | 6/2011 | Shustef | |
| 2011/0153412 A1 | 6/2011 | Novikov et al. | |
| 2011/0231478 A1 | 9/2011 | Wheeler et al. | |
| 2011/0264736 A1 | 10/2011 | Zuckerberg et al. | |
| 2011/0265011 A1 | 10/2011 | Taylor et al. | |
| 2011/0270649 A1 | 11/2011 | Kerho | |
| 2011/0288917 A1 | 11/2011 | Wanek et al. | |
| 2011/0307312 A1 | 12/2011 | Goeldi | |
| 2011/0313996 A1 | 12/2011 | Strauss et al. | |
| 2012/0047011 A1 | 2/2012 | Rippetoe et al. | |
| 2012/0109751 A1 | 5/2012 | Binenstock et al. | |
| 2012/0110464 A1* | 5/2012 | Chen et al. | 715/738 |
| 2012/0150989 A1 | 6/2012 | Portnoy et al. | |
| 2014/0074856 A1* | 3/2014 | Rao | 707/748 |

OTHER PUBLICATIONS

Christina Warren, How To: Measure Social Media ROI, Oct. 27, 2009, pp. 4-24. http://mashable.com/2009/10/27/social-media-roi/.
Final Office Action for U.S. Appl. No. 12/859,675, dated Dec. 31, 2012.
Final Office Action for U.S. Appl. No. 12/880,882, dated Jan. 13, 2014.
Final Office Action for U.S. Appl. No. 13/018,225, dated Aug. 7, 2013.
Final Office Action for U.S. Appl. No. 13/105,713, dated Apr. 11, 2013.
Justin Perkins, Is It Worth It? An ROI Calculator for Social Network Campaigns, Jul. 24, 2007, pp. 1-17, http://frogloop.com/social-network-calculator.
Non-Final Office Action dated Dec. 2, 2013 for U.S. Appl. No. 13/105,713.
Non-Final Office Action for U.S. Appl. No. 12/859,675, dated Aug. 1, 2012.
Non-Final Office Action for U.S. Appl. No. 12/880,882, dated May 23, 2013.
Non-Final Office Action for U.S. Appl. No. 13/018,225, dated Feb. 4, 2013.
Non-Final Office Action for U.S. Appl. No. 13/105,713, dated Aug. 2, 2013.
Non-Final Office Action for U.S. Appl. No. 13/105,713, dated Nov. 8, 2012.
Final Office Action dated May 22, 2014 for U.S. Appl. No. 13/105,713.
Non-final Office Action dated Jul. 30, 2014 for U.S. Appl. No. 12/880,882.
Non-Final Office Action dated Dec. 5, 2014 for U.S. Appl. No. 13/267,772.
Non-Final Office Action dated Dec. 18, 2014 for U.S. Appl. No. 12/859,675.
Notice of Allowance and Fee(s) Due dated Jan. 22, 2015 for U.S. Appl. No. 12/880,882.
Corrected Notice of Allowance and Fee(s) Due dated Feb. 24, 2014 for U.S. Appl. No. 12/880,882.
Non-final Office Action dated Mar. 20, 2015 for U.S. Appl. No. 13/018,225.
How to Write Advertisements that Sell, author unknown, form System, the magazine of Business, dated 1912, downloaded from http://library.duke.edu/digitalcollections/eaa_Q0050/ on Feb. 21, 2015.
History of OOH, downloaded from http://www.oaaa.org/OutofHomeAdvertising/HistoryofOOH.aspx# on Mar. 13, 2015.
Non-final Office Action dated Apr. 8, 2015 for U.S. Appl. No. 13/195,677.
Damien, "The How to Guide to Add Faccbook Social Plubins to Your WordPress Site", Apr. 28, 2010, from maketecheasier (downloaded Mar. 28, 2015 from http://www.maketecheasier.com/howto-guide-to-add-facebook-social-plugin-to-your-site/).
Final Office Action dated Jun. 24, 2015 for U.S. Appl. No. 12/859,675.
Non-final Office Action dated Jun. 17, 2015 for U.S. Appl. No. 13/105,713.
Final Office Action dated Jul. 1, 2015 for U.S. Appl. No. 13/267,772.
Final Office Action dated Aug. 19, 2015 for related U.S. Appl. No. 13/018,225.
Final Office Action dated Oct. 5, 2015 for related U.S. Appl. No. 13/195,677.

* cited by examiner

SYSTEMS AND METHODS FOR GENERATING SOCIAL INDEX SCORES FOR KEY TERM ANALYSIS AND COMPARISONS

CROSS REFERENCE TO RELATED APPLICATION

This application claims the benefit under 35 U.S.C. §119 (e) of U.S. Provisional Patent Application No. 61/098,792, filed Sep. 21, 2008, and entitled "Systems and Methods for Generating Social Media Index Scores for Brand or Key Term Analysis and Comparisons," which is incorporated herein by reference as if set forth herein in its entirety.

TECHNICAL FIELD

The present systems and methods relate generally to analyzing and generating index scores from online databases and, more particularly, to systems and methods for generating social index scores for analysis and comparisons associated with user-selected key terms within web-based social network sites and presenting results of the same to a user in a computer network.

BACKGROUND

For purposes including marketing analysis and business development, it is important for business entities to maintain an accurate gauge of how much a particular brand, trademark, or other form of key terms that relate to their business interests are being discussed or referenced online in various online venues and databases, such as web-based social network sites. There are many types of currently available social sites that are publically-accessible or commercial subscription-based. Some examples are social network venues and media sharing sites such as Facebook®, MySpace®, YouTube®, Flickr®, the microblogging site Twitter®, and online blogs, all of which are accessible over the internet, or "web-based." Some common characteristics among these online resources include an ever-evolving and viral nature and a rapidly-responsive spread of exposure and impact for certain key terms that are being searched for, discussed, viewed, and described within the sites by a plurality of individual users. Hereinafter, these online resources will also be generally referred to as "web-based social network sites."

These sites also have many significant characteristics that are widely disparate, such as the amount of their searchable stores of data. In searching blogs, for instance, one may find over 600 billion searchable entries. On the other hand, within the popular and growing micro-blogging service Twitter®, one may only find a few million searchable entries. These sites have great variation in audience size and the differing impact of various media types to their users; impact can vary rapidly over time, as sources increase or decrease in popularity, size, and types of media that can be accessed. Also, a piece of media such as a video may consist of only one search result but run many minutes in duration. Similarly, photos may have an impact that is not adequately captured by a few text tags.

For these and other reasons, aggregation and interpretation of data associated with key terms within web-based social network sites is made very difficult. There are many needs caused by these shortcomings. One such need is for a system and/or methods for retrieving data from the disparate online sources, weighting the impact of these sources relative to each other and relative to their total amount of data, and providing an accurate snap shot of the activity surrounding the key terms.

BRIEF SUMMARY OF THE DISCLOSURE

Briefly described, and according to one embodiment, the present disclosure is directed to a method, in a computer network, for generating social index scores associated with key terms within web-based social network sites. Generally, the method comprises the steps of receiving an input of the key terms from a user, generating search queries from the key terms, providing the generated search queries to the web-based social network sites, capturing search results received from the web-based social network sites in response to the provided search queries, generating, from the captured search results, the social index scores using a processing algorithm, storing the generated social index scores in at least one database, and, providing at least one representation of the generated social index scores to the user in one or more of numerical, visual, and printed form.

According to one aspect, the steps of providing the generated search queries, capturing the search results, generating the social index scores, and storing the generated social index scores are performed at regular intervals over time. The processing algorithm generates the social index scores from at least one of data associated with the frequency of exposure of the key terms to the user and to third-party users within the web-based social network sites and data associated with the frequency of search queries containing the key terms received by the web-based social network sites. The at least one representation of the social index scores comprises at least one of graphs and charts visually displayed to the user. The at least one representation comprises a visual representation of the social index scores generated at each of the regular intervals over time. The frequency of exposure is comprised at least partially of the number of communications associated with the key words between the user and a plurality of the third-party users of the web-based social network sites, and is further comprised at least partially of the number of searchable web-pages within each of the web-based social network sites.

According to an additional aspect, the key terms comprise two or more different sets of terms directed to two or more corresponding different subject matters. The processing algorithm generates the social index scores from at least one of data associated with the frequency of exposure of each of the two different sets of terms to the user and to third-party users within the web-based social networks and data associated with the frequency of search queries containing the key terms received by the web-based social network sites. The social index scores consist of one social index score for each of the two or more different sets of terms. The frequency of exposure is comprised at least partially of the number of communications associated with the key words between the user and a plurality of the third-party users of the web-based social network sites, and is further comprised at least partially of the number of searchable web-pages within each of the web-based social network sites. The at least one representation of the social index scores comprises a visual comparison of the two or more social index scores.

According to an additional embodiment, the present disclosure is directed to a system in a computer network for generating social index scores associated with key terms within web-based social network sites. Generally, the system comprises a means for receiving an input of the key terms from a user, a means for generating search queries from the key terms, a means for providing the generated search queries to the web-based social network sites, a means for capturing search results received from the web-based social network sites in response to the provided search queries, a means for generating, from the captured search results, the social index scores using a processing algorithm, a means for storing the generated social index scores that is operatively coupled to the means for generating the social index scores, and, a means for providing at least one representation of the generated social index scores to the user in one or more of numerical, visual, and printed form, that is operatively coupled to at least one of the means for generating the social index scores and the means for storing the generated social index scores.

According to one aspect, the means for receiving the input of the key terms is a user computer or mobile electronic device that is operatively coupled with the computer network through a network connection. The means for storing the generated social index scores comprises at least one database for storing previously generated social media index scores. The web-based social network sites comprise one or more of social media sites, video sharing sites, microblogging sites, and blog post sites. The means for receiving the input of the key terms comprises an interface means comprising interactive user controls for inputting the key terms in response to an action by the at least one user. The interactive user controls are graphical user interface controls displayed to the user on a computer screen.

According to another aspect, the means for providing at least one representation of the generated social index scores comprises a computer screen for displaying at least one of the numerical and visual representations of the index scores to the user. The at least one database consists of a database for storing social media index scores generated at regular intervals over time and a database for storing cumulative data comprising a plurality of social media index scores, each generated at a different one of the regular intervals over time.

According to still another embodiment, the present disclosure is directed to a method of using a system in a computer network for generating social index scores associated with key terms within web-based social network sites, the system comprising a means for receiving an input of the key terms from a user, a means for generating search queries from the key terms, a means for providing the generated search queries to the web-based social network sites, a means for capturing search results received from the web-based social network sites in response to the provided search queries, a means for generating, from the captured search results, the social index scores using a processing algorithm, a means for storing the generated social index scores that is operatively coupled to the means for generating the social index scores, and a means for providing at least one representation of the generated social index scores to the user in one or more of numerical, visual, and printed form, that is operatively coupled to at least one of the means for generating the social index scores and the means for storing the generated social index scores. Generally, the method comprises the steps of accessing the means for receiving input of the key terms through the computer network, inputting the key terms using the means for receiving input of the key terms, and viewing the at least one representation of the generated social index scores.

According to one aspect, the key terms comprise at least one of trademarks and product brands. The method further comprises the steps of: editing the key terms using the means for receiving input of the key terms, in response to viewing the at least one representation of the generated social index scores; inputting the edited key terms using the means for receiving input of the key terms; and, viewing at least one representation of social index scores generated from the edited key terms, in one or more of numerical, visual, and printed form.

According to another aspect, the step of inputting the key terms comprises inputting two or more different sets of terms directed to two or more corresponding different subject matters. The generated social index scores comprise a social index score for each one of the two or more different sets of terms, and the at least one representation of the generated social index scores comprises a visual representation of each one of the social index scores for the two or more different sets of terms. The at least one visual representation of the social index scores comprises a visual comparison of the social index scores for the two or more different sets of terms.

According to still another embodiment, the present disclosure is directed to software stored on a computer-readable medium for causing a computing system in a computer network to perform functions for generating social index scores associated with key terms within web-based social network sites. Generally, the functions comprise receiving an input of the key terms from a user, generating search queries from the key terms, providing the generated search queries to the web-based social network sites, capturing search results received from the corresponding at least one of the selected databases and web-based social network sites in response to the provided search queries, generating, from the captured search results, the social index scores using a processing algorithm, storing the generated social index scores in at least one database; and, providing at least one representation of the generated social index scores to the user in one or more of numerical, visual, and printed form. The functions of providing the generated search queries, capturing the search results, generating the social index scores, and storing the generated social index scores are performed at regular intervals over time. The at least one representation of the social index scores comprises at least one of graphs and charts visually displayed to the user.

According to one aspect, the processing algorithm generates the social index scores from at least one of data associated with the frequency of exposure of the key terms to the user and to third-party users within the web-based social network sites and data associated with the frequency of search queries containing the key terms received by the web-based social network sites. The at least one representation comprises a visual representation of the social index scores generated at each of the regular intervals over time. The frequency of exposure is comprised at least partially of a number of communications associated with the key words between the user and a plurality of the third-party users of the web-based social network sites, and is further comprised at least partially of the number of searchable web-pages within each of the web-based social network sites.

According to an additional aspect, the key terms comprise two or more different sets of terms directed to two or more corresponding different subject matters. The processing algorithm generates the social index scores from at least one of data associated with the frequency of exposure of each of the two different sets of terms to the user and to third-party users within the web-based social networks and data associated with the frequency of search queries containing the key terms received by the web-based social network sites. The social index scores consist of one social index score for each of the two or more different sets of terms. The frequency of exposure is comprised at least partially of a number of communications associated with the key words between the user and a plurality of the third-party users of the web-based social network sites, and is further comprised at least partially of the number of searchable web-pages within each of the web-based social network sites. The at least one representation of the social index scores comprises a comparison of each of the index scores for each of the corresponding two or more different sets of terms.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF PREFERRED EMBODIMENTS

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Other systems, methods, features and advantages of the present disclosure will be or become apparent to one with skill in the art upon examination of the following drawings and detailed description. It is intended that all such additional systems, methods, features and advantages be included within this description and be within the scope of the present disclosure.

Overview

According to exemplary embodiments, the present disclosure relates to systems and methods for generating social media index scores to enable brands, agencies, and publishers to determine how much a brand is being discussed or referenced online in a wide variety of online social venues. Particular brands or key terms can be compared instantaneously with others or the same brand or key terms can be analyzed over time to determine whether awareness or discussion is expanding or contracting for particular brands, companies, people, or topics. According to exemplary embodiments, the system uses key terms or free text search, so that terms or brands can be compared in a variety of ways. Some exemplary types of comparisons that can be run include competing brands (e.g. "Coke" (R) versus "Pepsi" (R)) brand extensions (e.g. "Diet Coke" (R) versus "Diet Pepsi" (R)), slogans or taglines (e.g. "Coke is It" (R) versus "The Pause That Refreshes" (R))) and counterintuitive pairings (e.g. "Coke" (R) versus "Sarah Palin"). However, the potential search pairings or comparisons are limited only by language and the creativity of those doing the search. In addition, as stated above, a single brand can be run over time and compared to historical data in order to determine whether brand awareness is expanding, contracting, or stagnant. Such data can be very useful to analyze the results of active marketing strategies in order to determine whether such strategies are having the desired impact.

According to exemplary embodiments, to determine and calculate, i.e. generate, a social index score, the system first queries a plurality of publicly-available or subscriber accessible web-based social network sites that have search engine capability. The desired key terms (or search queries) are sent to such sites and the total number of results available is determined. In some cases, public APIs are used to retrieve similar data. For example, data may be gathered from sites such as MySpace®, YouTube®, and Flickr®. A scraping method can be used to retrieve total number of hits information, which is usable for the above web-based social network sites, from which data is taken using their public API. Daily snapshots of the various databases or web sites are taken to determine activity associated with any given brand or key term for that interval over time. In such situations, it may only be necessary to scrape a site once per day, per unique key word search, and to store that data in a database. Thus, if the same key term is searched more than once in a given day (or other subset or superset of time, i.e. interval), the search results from a prior search can be pulled from the database cache rather than used as another query to the same sites. This can be configured for any time interval or can be turned off if there are reasons to obtain dynamic search results that may change rapidly.

According to exemplary embodiments, the system uses a regular expression pattern match on the queries above to determine the total results. For example, if a search for "bears" on Flickr® returned the following: "We found 1,179, 422 results matching bears", then the system scrapes the reply to identify the number inserted between "We found" and "results matching." Since each website or database has a unique but consistent pattern match for returning search results, it is possible to formulate a scraping technique to identify where the total search result information is provided. A commercial data exchange can be configured to obtain similar information, but the above technique is useable for obtaining data from a website search and by scraping the returned data in the html code from the relevant URL. As stated previously, sites such as YouTube® are not web pages, but rather an API call. To run a specific search, the system typically lowers the case and URL encodes the search term and then passes it through the URLs defined above.

User Interface

In exemplary embodiments, the system is powered and presented to users through a simple user interface that is web-based, stand-alone software, or integrated into third party platforms. As stated previously, a user or system administrator is able to enter a single search term for analysis or two search terms for comparison. The search term can actually be a single word, name, or band, or a combination of terms (with or without quotation marks). The terms can be entered into a free text form search field or window, or, in an embodiment not shown, can be selected from pull down menus of available or frequently requested terms or phrases. Once the user selects "submit", the search is run, search results are obtained, a social index score is generated, and then the data is presented in written and graphical format.

In these embodiments, the system compiles data from a variety of publicly-available sources or from commercial subscription databases. An advantage of accessing publicly-available social network websites and multimedia systems is due to the ever-evolving nature, viral nature, and rapidly-responsive nature of brands and key terms being discussed, viewed, and described on these sources. The system is able to retrieve data from these disparate sources, weight the impact of these sources relative to each other and relative to the total amount of data from such sources, and provide an accurate snap shot of the social media conversations surrounding the searched-for brand or key term. The system is also able to take the varying size of searchable stores of data for each of the sources into account.

The system can account for the disparities in audience size and the differing impact of various media types by assigning an impact rating to different data sources. This impact rating can vary over time, as sources increase or decrease in popularity, size, and types of media that can be accessed from such sources or web-based sites. Some example impact ratings for a variety of categories are: for social media sites: 1×; for video sharing sites: 3×; for microblogging sites: 3×; for photo sharing sites: 3×; and, for blog posts: 1×. These impact ratings are then included in the following equation, or "processing algorithm":

$$RawScore = \sum \left( \frac{\text{Search results for that term}}{\text{Estimated indexed pages on that site}} \right) \times 100 \times \text{impact rating}$$

The cumulative raw score represents the sum of individual raw scores across major categories of sites. If additional sources are added, they are done in a way to ensure that the cumulative raw score does not grow simply as a result of the inclusion of more data sources.

According to exemplary embodiments, the cumulative raw scores for the most visible and recognizable trademark brands run in the range of tenths of a point (e.g., ~0.10) up to ~11.0. Because it is difficult for most users to relate to decimal points, the raw scores are scaled using an index multiplier. That index multiplier can be set at 80 (which results in 0.1 raw score having a social index score of 8 and an 11 raw score having a social index score of 880). It will be appreciated by those skilled in the art that any multiplier may be chosen to result in social index scores between a desired range. The goal is to provide social index scores that are consistent over time, so that improvements to brands based on increased marketing can be tracked and verified, and so that two or more brands can be compared to determine how much discussion and impact each brand is having within the social media context. Drawing FIGS. 1-3

Figure 1:
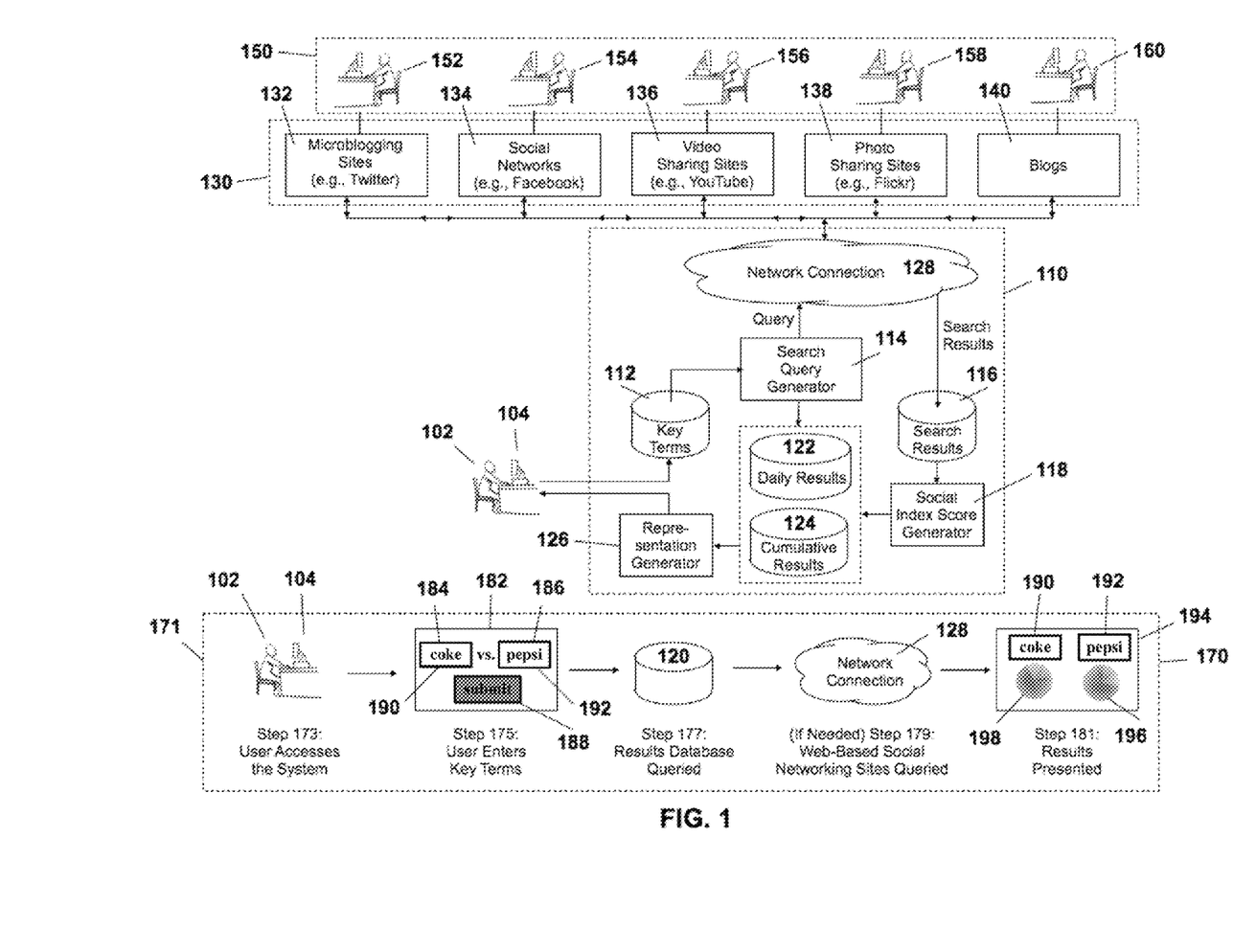
FIG. 1 illustrates the system architecture according to one embodiment of the present system for generating social index scores from key terms, and a diagram illustrating the flow of operation of one embodiment of a method of using the system.

Referring now to FIG. 1, the system architecture according to one embodiment of the present disclosure is shown. The system 110 operates in a computer network, for generating social index scores associated with key terms 190, 192 within web-based social network sites 130. As shown in FIG. 1, the web-based social network sites 130 include microblogging sites 132, social networks 134, video sharing sites 136, photo sharing sites 138, and blogs 140. There are two different sets of key terms 190, 192. The system 110 includes a database 112 for receiving an input of the key terms 190, 192 from a user 102. The database 112 is operatively coupled to a user computer 104 that has a graphical user interface. A search query generator 114 is operatively coupled to both the database 112 and to a network connection 128. The search query generator 114 generates search queries from the key terms 190, 192, and the generated search queries are provided to the web-based social network sites 130 through the network connection 128. The system 110 also includes a database 116 for capturing search results received from the web-based social network sites 130, through the network connection 128, in response to the provided search queries. A social index score generator 118 that is operatively coupled to the database 116 generates, from the captured search results, the social index scores using a processing algorithm. Databases 120 are operatively coupled to the social index score generator 118 and are operable for storing the generated social index scores. The databases 120 include a database 122 for storing social index scores generated on a daily basis, and also a database 124 for storing cumulative social index scores generated over time, such as over several days, months, or years.

Still referring to the embodiment shown in FIG. 1, the system 110 further includes a representation generator and provider 126, for providing at least one representation 196, 198 of the social index scores stored by the databases 120 to the user 102, in one or more of numerical, visual, and printed form. The representation generator and provider 126 is operatively coupled to the social index score generator 118 and the databases 120, and it displays the generated representations 196, 198 on the screen of the user computer 104. As shown by screen shot 194, the generated representations 196, 198 are pie charts associated with each of the two different sets of key terms 190, 192. As shown in the screen shot 182, graphical user interface controls 184, 186, 188 displayed on the user computer 104 are operable for receiving the two sets of key terms 190, 192 in response to an action by the user 102 and providing the received key terms to the database 112. The action by the user can include entering the key terms 190, 192 into boxes 184, 186 and then submitting the entered key terms 190, 192 using the interface control button 188.

FIG. 1 also shows an embodiment of a method 171 of using the system 110. The method 171 includes the step 173 of accessing the system 110 on a user computer 104 or mobile device (not shown). Next, at step 175, key terms 190, 192 are entered and provided to the database 112 using graphical interface controls 184, 186, 188, as shown in screen shot 182. At step 177, databases 120 receive a search query based on the key terms 190, 192 entered. From step 177, flow continues either directly to step 181, or, alternatively, to step 179 and then step 181. According to the first path corresponding directly to step 181, representations of the social index scores are retrieved from the databases 120 and displayed to the user 102, as shown in screen shot 194. According to the alternative path, corresponding to step 177 followed by steps 179 and 181, the databases 120 are queried at step 177, and at step 179, web-based social network sites are queried. The search results received are then transformed into social index scores by social index score generator 118, and then the results are displayed to the user 102, as shown in screen shot 194, in the form of visual representations 196, 198 corresponding to the social index scores generated for each of the two sets of key terms 190, 192. In this embodiment, the key terms 190, 192 are two competing brands of soft-drinks, namely "coke" and "pepsi" (Coke® and Pepsi®).

Figure 2A:
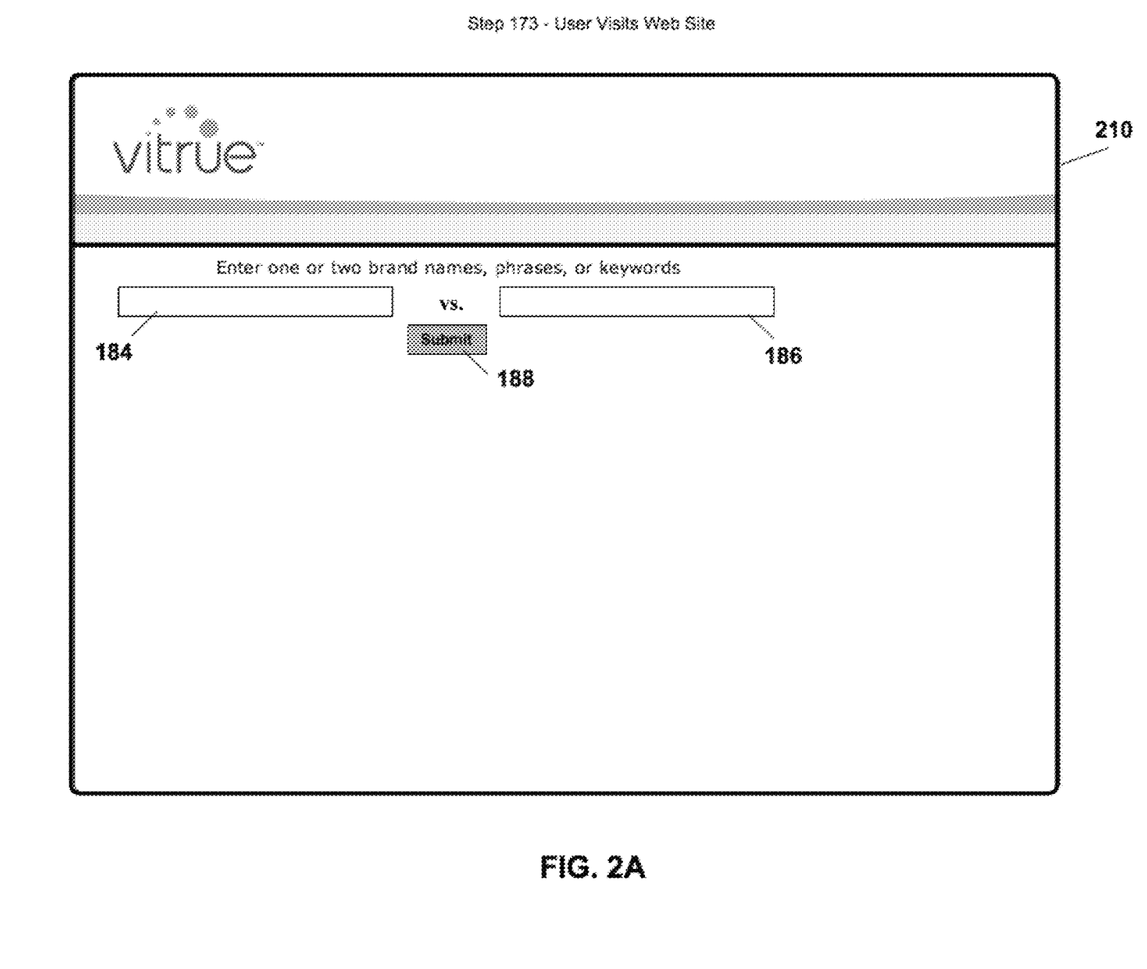
FIGS. 2A-2D are visual representations of screen shots displayed on a computer screen to a user of the system of FIG. 1, according to a sequence of steps of performing the method of using the system shown in FIG. 1.
Figure 2B:
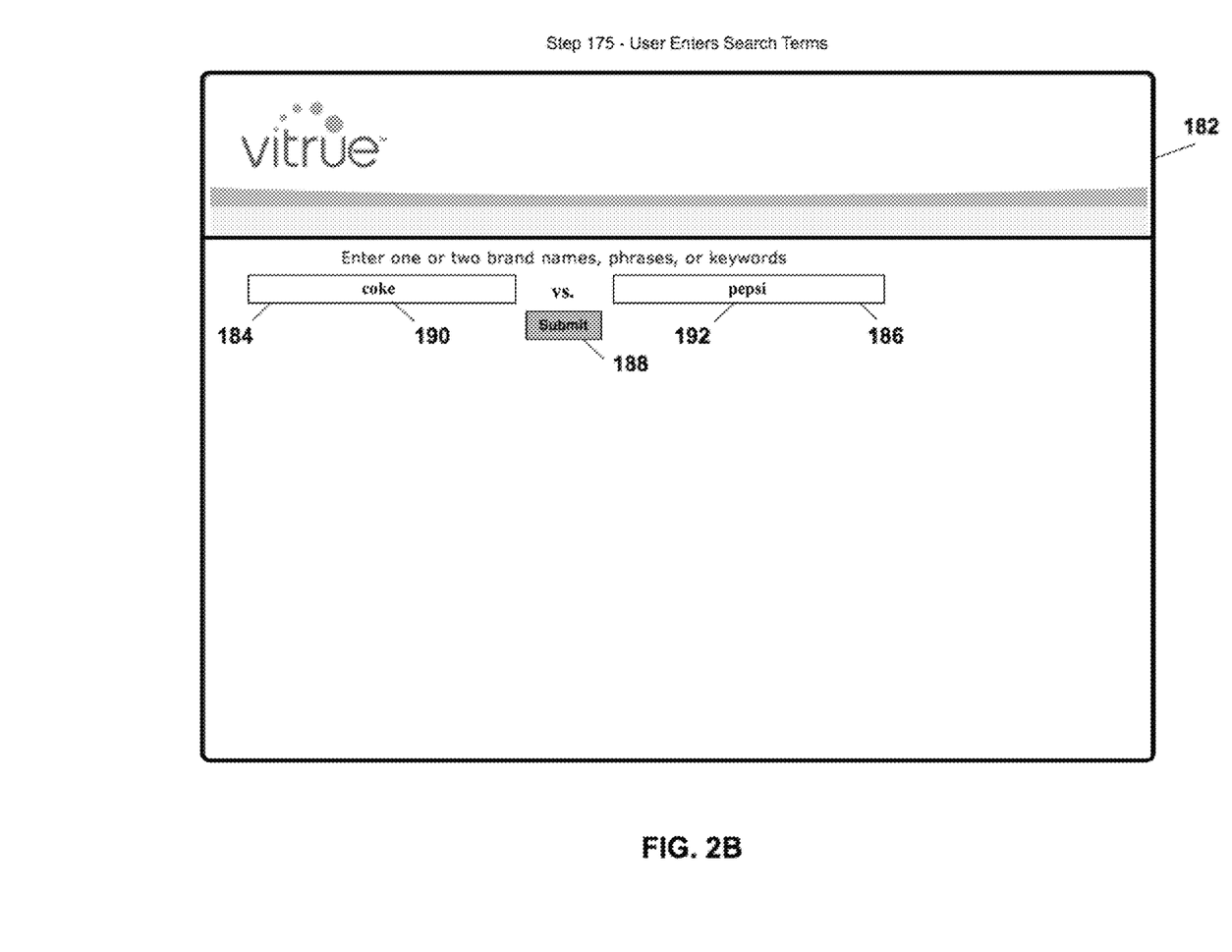

FIGS. 2A-2D are visual representations of screen shots (210, 182, 194, and 220, respectively) displayed on a computer screen to a user 102 of the system 110 of FIG. 1, according to a sequence of steps 173, 175, 181, 201 of performing the method of using the system 110. FIG. 2A corresponds to step 173 as shown in FIG. 1, where the user 102 accesses the graphical user interface shown in screen shot 210, using a user computer (e.g. user computer 104, FIG. 1). Next, at step 175 and as shown in the screen shot 182 of FIG. 2B, the user enters two sets of different key terms 190, 192 using the graphical user interface controls 184, 186, and 188. Specifically, as shown in FIG. 2B, the user 102 enters two sets of different key terms 190, 192 into the boxes (search fields) 184, 186 and then submits the entry using control button 188 (labeled "submit"). In this embodiment, the key terms entered are "coke" (190) and "pepsi" (192), corresponding to the same key terms shown in FIG. 1. This step of submitting the key terms 190, 192 initiates the process of generating a search query from the key terms 190, 192, using the search query generator 114 shown in FIG. 1.

Figure 2C:
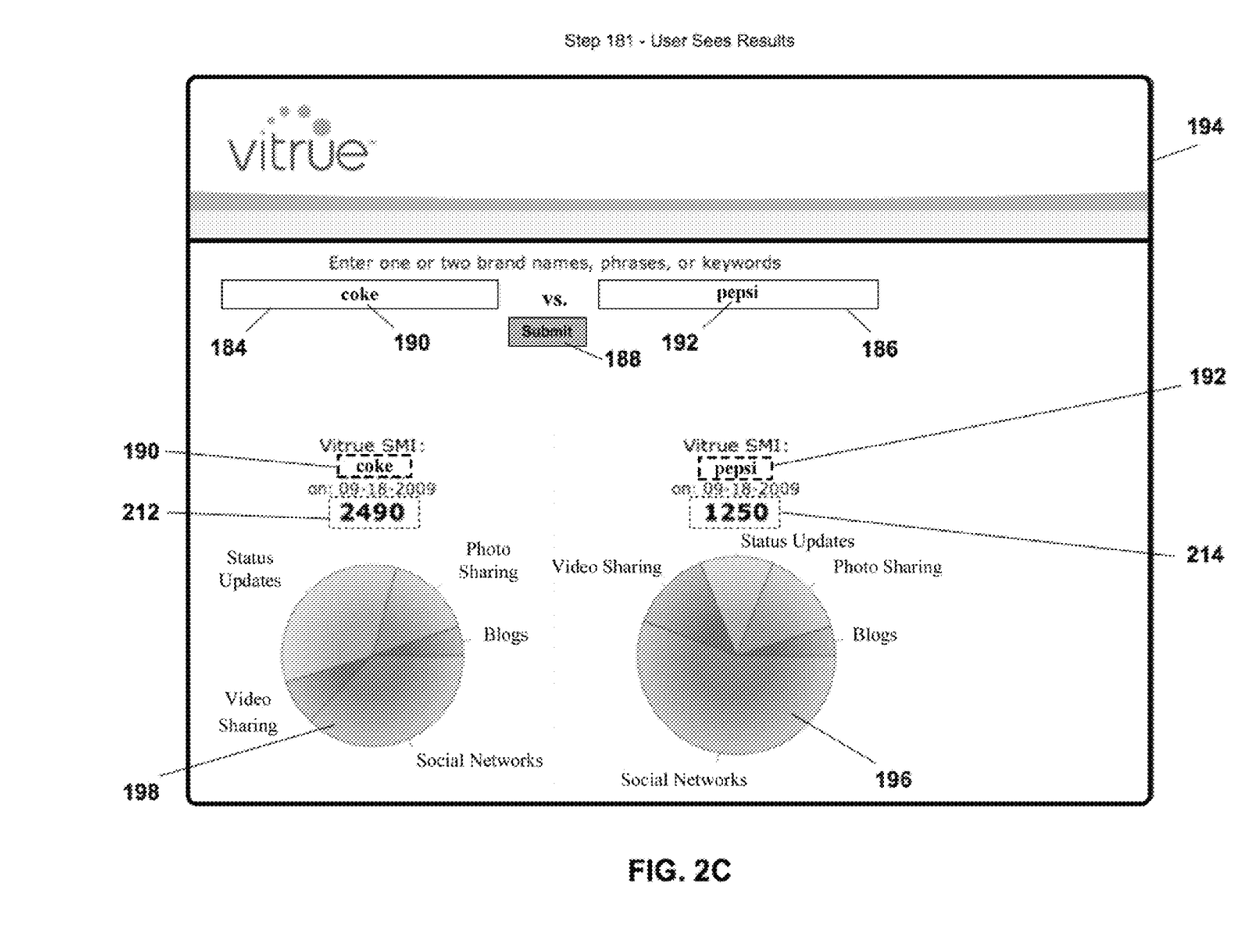
Figure 2D:
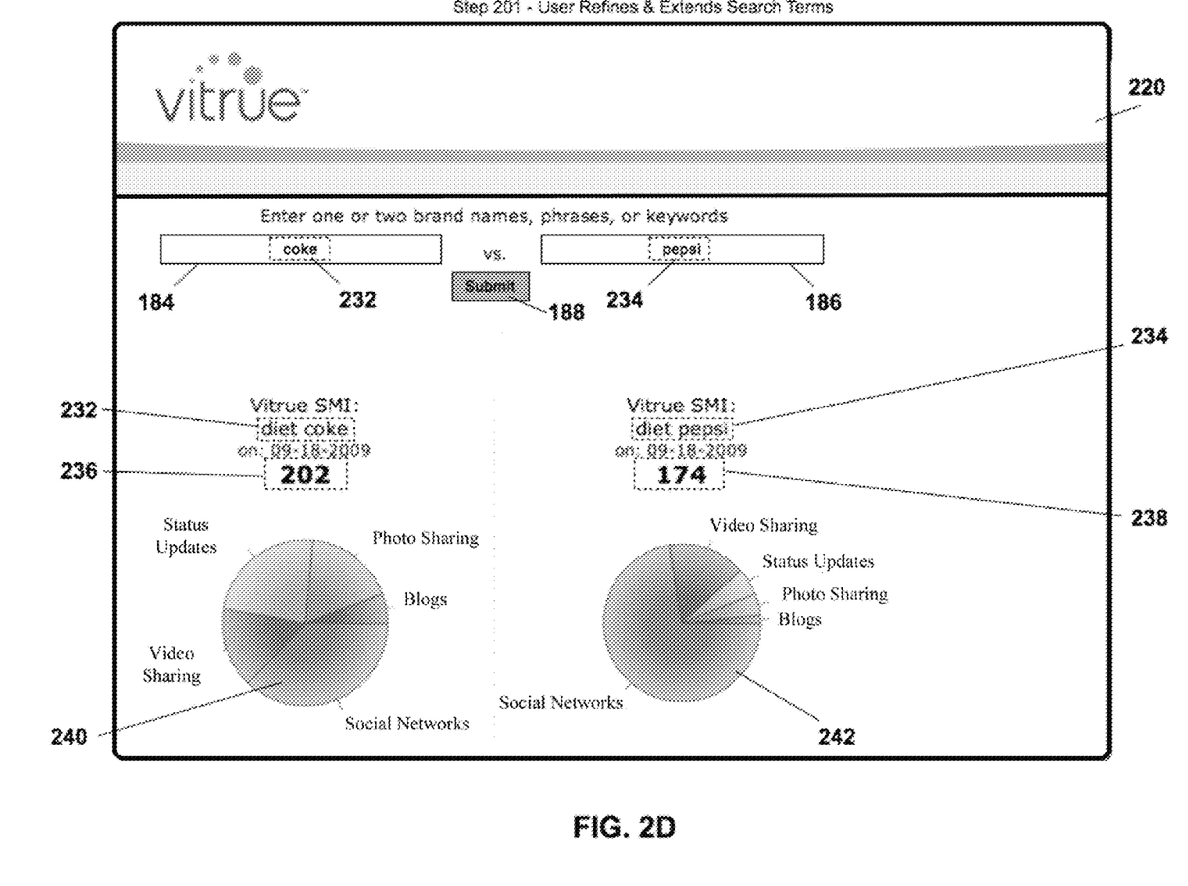

FIG. 2C shows a screen shot 194 which corresponds to step 181 in accordance with the embodiment of FIG. 1. At step 181, the user 102 sees results of the search query previously submitted using key terms 190, 192 (at step 175), in the form of numerical and visual representations 212, 214 and 196, 198, respectively. As shown, the numerical representations 212, 214 are social index scores that correspond to each of the key terms 190, 192, namely, a social index score of "2740" for "coke" and a social index score of "1180" for "pepsi." Thus, in this embodiment, a visual comparison of the social index scores for each of these competing brands is displayed to the user 102. The visual representations 196 and 198 in FIG. 2C are pie charts showing the proportion of the composite social index score for each of "coke" and "pepsi" that are contributed by each of the various web-based social network sites 130. As shown in the screen shot 220 of FIG. 2D, which corresponds to step 201, the user 102 refines and extends the initial key terms used, after seeing the results from the first set of key terms used. In this embodiment, refined and extended key terms 232 and 234 for "diet coke" and "diet pepsi" (Diet Coke® and Diet Pepsi®), respectively, are entered into the boxes 184 and 186, and then submitted using control button 188. This initiates the generation of a revised and extending search query from these terms, by the search query generator 114. The search results produced are also shown in the screen shot 220 of FIG. 2D, showing that "diet coke" (Diet Coke®) has a social media index score of "192", whereas "diet pepsi" (Diet Pepsi®) has a social media index score of "65.6."

Figure 3:
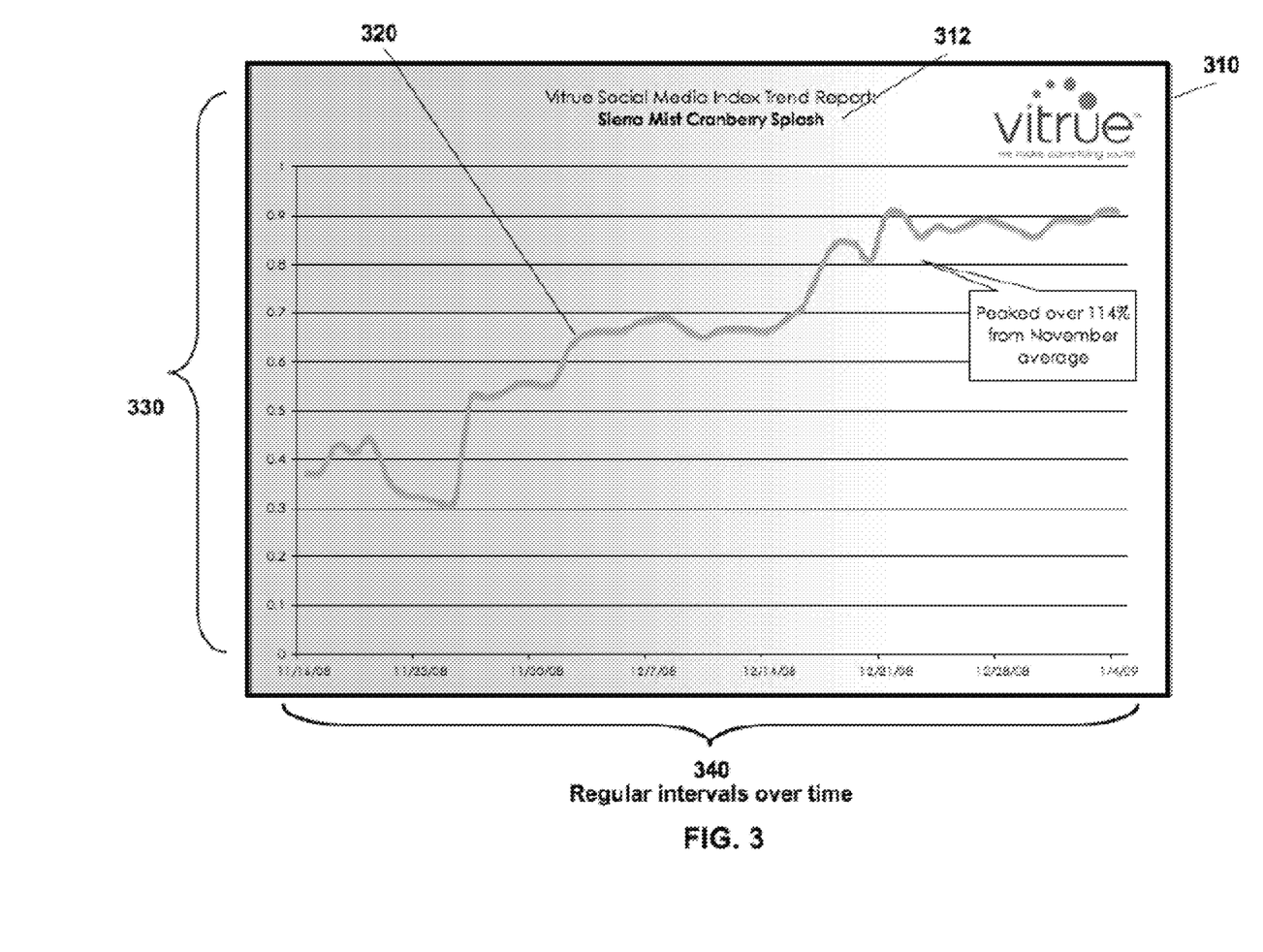
FIG. 3 is a visual representation of a screen shot displayed on a computer screen to a user of the system of FIG. 1, showing an exemplary plot of social index scores generated at regular intervals over time for particular key terms, by the system and methods according to the embodiments shown in FIGS. 1 and 2A-2D.

Now referring to FIG. 3, a screen shot 310 is shown, as displayed on the computer screen of the user 102. The screen shot 310 includes a visual representation in the form of a chart with an exemplary plot 320 of social index scores (y-axis 330) as generated at regular intervals over time (x-axis 340), for yet another set of key terms, which here is another brand of competing soft-drink, namely "Sierra Mist Cranberry Splash" (Sierra Mist Cranberry Splash®). This embodiment of the visual representation is generated and provided by the system 110 as shown in FIG. 1 and according to the methods of the embodiments shown in FIGS. 1 and 2A-2D.

The foregoing description of the exemplary embodiments has been presented only for the purposes of illustration and description and is not intended to be exhaustive or to limit the inventions to the precise forms disclosed. Many modifications and variations are possible in light of the above teaching. For instance, the system disclosed can be used to generate social index scores representative of the sentiment that key terms carry on various online sources. In this way, a user can receive generated results providing an analysis of the positive or negative connotations that a certain brand or multiple brands have within social network sites, for example, positive terminology associated with the key terms within discussions among users on the social network sites.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. In a computer network, a method for quantifying a significance of terms used within web-based social network sites, comprising the steps of:
   implementing a configuration of a plurality of databases comprising a key terms database, a search database, a results database and a cumulative results database,
   the key terms database configured for storing key terms associated with a marketing of goods or services, wherein the stored key terms are used to generate search queries that are to be provided to a plurality of web-based social network sites,
   the search database configured for storing search results that are received in response to the generated search queries, wherein the stored search results are transformed into social index scores that indicate a respective significance of the key terms within the plurality of web-based social networks,
   the results database configured for storing social index scores generated at regular intervals of time, wherein the data stored in the results database is retrieved in order to represent the social index score for the key terms during that interval of time, and
   the cumulative results database configured for storing cumulative data comprising a plurality of storing social index scores generated over time, wherein the data stored in the cumulative results database is retrieved in order to represent social index scores for the key terms generated over regular intervals of time,
   receiving an input of one or more key terms corresponding to marketing of goods or services, wherein the received input is stored in the key terms database that stores key terms that are used to generate search queries;
   generating the search queries from the one or more key terms for retrieving information from the plurality of web-based social network sites indicating use of the one or more key terms within the plurality of web-based social network sites;
   providing the generated search queries to the plurality of web-based social network sites;
   receiving search results from the plurality of web-based social network sites in response to the provided search queries, wherein the received search results correspond to social network data from a plurality of social network site users, the received search results stored in the search database that is accessed to transform the search results into social index scores;
   for a web-based social network site of the plurality of web-based social network sites from which search results are received,
      assigning an impact weight to the web-based social network site based at least in part on a total amount of stored data of the web-based social network site and a type of media accessed from the web-based social network site;

associating the received search results for the web-based social network site with the impact weight corresponding to the web-based social network site;

generating one or more social index scores by taking into account at least the received search results and the respective impact weights for the plurality of web-based social network sites, the one or more social index scores stored in at least one of the results database and the cumulative results database, wherein the stored data is retrieved to provide one or more representations of the social index score to a user; and providing, through a user interface, at least one representation of the generated one or more social index scores to the user.

2. The method of claim 1, wherein the steps of providing the generated search queries, receiving the search results, and generating the one or more social index scores are performed at regular intervals over time.

3. The method of claim 2, wherein the at least one representation comprises a visual representation of the one or more social index scores generated at each of the regular intervals over time.

4. The method of claim 1, wherein the one or more social index scores are generated from at least one of data associated with a frequency of exposure of the one or more key terms to users within the plurality of web-based social network sites and data associated with a frequency of search queries containing the one or more key terms received by the web-based social network sites.

5. The method of claim 4, wherein the frequency of exposure is based at least in part upon a number of communications associated with the one or more key terms between users of the web-based social network sites, and a total number of searchable web-pages for a particular web-based social network site of the plurality of web-based social network sites.

6. The method of claim 1, wherein the at least one representation of the one or more social index scores comprises at least one of graphs and charts visually displayed to the user.

7. The method of claim 1, wherein the one or more key terms comprise two or more different sets of terms.

8. The method of claim 7, wherein two or more social index scores are generated from at least one of data associated with a frequency of exposure of each of the two different sets of terms to users within the web-based social networks and data associated with a frequency of search queries containing the one or more key terms received by the web-based social network sites.

9. The method of claim 7, wherein two or more social index scores correspond to the two or more different sets of terms, and wherein the two or more social index scores comprise one social index score for each of the two or more different sets of terms.

10. The method of claim 9, wherein the at least one representation of the two or more social index scores comprises a visual comparison of the two or more social index scores.

11. The method of claim 1, wherein the one or more key terms are input by a user.

12. The method of claim 1, wherein each impact weight assigned to each web-based social network site is based at least partially on a number of users associated with each web-based social network site.

13. The method of claim 1, wherein the one or more social index scores are generated by taking into account the number of pages indexed on each web-based social network site.

14. The method of claim 1, wherein the search results for each of the plurality of web-based social network sites comprise an indication of a number of instances of a given key term within a respective web-based social network site.

15. The method of claim 1, wherein the impact weight of the respective web-based social network site is further based at least in part on a popularity of the respective site.

16. The method of claim 1, wherein the impact weight of the respective web-based social network site is further based at least in part on a media type associated with the respective site.

17. The method of claim 1, wherein the web-based social network site is associated with an API call.

18. In a computer network, a system for quantifying a significance of terms used within web-based social network sites, comprising:

a means for implementing a configuration of a plurality of databases comprising a key terms database, a search database, a results database and a cumulative results database, the key terms database configured for storing key terms associated with a marketing of goods or services, wherein the stored key terms are used to generate search queries that are to be provided to a plurality of web-based social network sites, the search database configured for storing search results that are received in response to the generated search queries, wherein the stored search results are transformed into social index scores that indicate a respective significance of the key terms within the plurality of web-based social networks, the results database configured for storing social index scores generated at regular intervals of time, wherein the data stored in the results database is retrieved in order to represent the social index score for the key terms during that interval of time, and the cumulative results database configured for storing cumulative data comprising a plurality of storing social index scores generated over time, wherein the data stored in the cumulative results database is retrieved in order to represent social index scores for the key terms generated over regular intervals of time, a means for receiving an input of one or more key terms corresponding to marketing of goods or services, wherein the received input is stored in the key terms database that stores key terms that are used to generate search queries;

a means for generating the search queries from the one or more key terms for retrieving information from the plurality of web-based social network sites indicating use of the one or more key terms within the plurality of web-based social network sites;

a means for providing the generated search queries to the plurality of web-based social network sites;

a means for receiving search results from the plurality of web-based social network sites in response to the provided search queries, wherein the received search results correspond to social network data from a plurality of social network site users, the received search results stored in the search database that is accessed to transform the search results into social index scores;

for a web-based social network site of the plurality of web-based social network sites from which search results are received, a means for assigning an impact weight to the web-based social network site based at least in part on a total amount of stored data of the web-based social network site and a type of media accessed from the web-based social network site;

a means for associating the received search results for the web-based social network site with the impact weight corresponding to the web-based social network site;

a means for generating one or more social index scores by taking into account at least the received search results and the respective impact weights for the plurality of web-based social network sites, the one or more social index scores stored in at least one of the results database and the cumulative results database, wherein the stored data is retrieved to provide one or more representations of the social index score to a user; and a means for providing, through a user interface, at least one representation of the generated one or more social index scores to the user.

19. The system of claim 18, wherein the means for receiving the input of the one or more key terms is a computer or mobile electronic device that is operatively coupled with the computer network through a network connection.

20. The system of claim 18, further comprising a means for storing the social index scores.

21. The system of claim 20, wherein the means for storing the social index scores comprises the database.

22. The system of claim 18, wherein the web-based social network sites comprise one or more of social media sites, video sharing sites, microblogging sites, and blog post sites.

23. The system of claim 18, wherein the means for receiving the input of the one or more key terms comprises an interface means comprising interactive user controls for inputting the key terms.

24. The system of claim 23, wherein the interactive user controls are graphical user interface controls displayed to the user on a computer screen.

25. The system of claim 18, wherein the means for providing at least one representation of the generated one or more social index scores comprises a computer screen for displaying at least one of numerical and visual representations of the index scores to the user.

26. The system of claim 18, wherein the impact weight of the respective web-based social network site is further based at least in part on a popularity of the respective site.

27. The system of claim 18, wherein the impact weight of the respective web-based social network site is further based at least in part on a media type associated with the respective site.

* * * * *